(12) United States Patent
Saidj

(10) Patent No.: US 9,052,700 B2
(45) Date of Patent: Jun. 9, 2015

(54) RFID PRESENCE DETECTION DEVICE

(71) Applicant: NEOPOST TECHNOLOGIES, Bagneux (FR)

(72) Inventor: Slimane Saidj, Caumont sur Durance (FR)

(73) Assignee: NEOPOST TECHNOLOGIES, Bagneux (FR)

( * ) Notice: Subject to any disclaimer, the term of this patent is extended or adjusted under 35 U.S.C. 154(b) by 134 days.

(21) Appl. No.: 13/724,909

(22) Filed: Dec. 21, 2012

(65) Prior Publication Data

US 2013/0162406 A1 Jun. 27, 2013

(30) Foreign Application Priority Data

Dec. 23, 2011 (EP) .................................... 11306770

(51) Int. Cl.

| | | |
|---|---|---|
| *H04Q 5/22* | (2006.01) | |
| *G08B 13/18* | (2006.01) | |
| *G08B 5/22* | (2006.01) | |
| *G08B 23/00* | (2006.01) | |
| *G08B 13/00* | (2006.01) | |
| *G08B 13/08* | (2006.01) | |
| *G01S 13/74* | (2006.01) | |
| *G01S 13/00* | (2006.01) | |
| *G05B 1/00* | (2006.01) | |
| *G01S 13/04* | (2006.01) | |
| *G01S 13/87* | (2006.01) | |
| *G01V 15/00* | (2006.01) | |

(52) U.S. Cl.
CPC . *G05B 1/00* (2013.01); *G01S 13/04* (2013.01); *G01S 13/74* (2013.01); *G01S 13/87* (2013.01); *G01V 15/00* (2013.01)

(58) Field of Classification Search
CPC ..................... G06K 2017/0045; H04B 5/0062; H01Q 1/2225
USPC .......... 340/10.1, 572.1, 13.26, 10.4, 8.1, 500, 340/541, 545.3, 567; 342/42–52, 147
See application file for complete search history.

(56) References Cited

U.S. PATENT DOCUMENTS

| | | | |
|---|---|---|---|
| 7,986,232 B2 * | 7/2011 | Sharma ....................... | 340/545.1 |
| 2006/0017573 A1 * | 1/2006 | Noguchi ..................... | 340/572.8 |
| 2007/0236337 A1 * | 10/2007 | Braun et al. ................ | 340/10.34 |
| 2008/0057876 A1 * | 3/2008 | Hsia et al. ..................... | 455/69 |
| 2008/0074268 A1 | 3/2008 | Shafer | |
| 2010/0164710 A1 * | 7/2010 | Chung et al. ................ | 340/539.1 |
| 2012/0112923 A1 * | 5/2012 | Chupa ......................... | 340/686.1 |
| 2012/0256749 A1 * | 10/2012 | Rao et al. .................... | 340/573.1 |

FOREIGN PATENT DOCUMENTS

| | | |
|---|---|---|
| EP | 1 898 341 A1 | 8/2007 |
| EP | 2 228 748 A1 | 3/2010 |

* cited by examiner

*Primary Examiner* — George Bugg
*Assistant Examiner* — Munear Akki
(74) *Attorney, Agent, or Firm* — Sughrue Mion, PLLC

(57) ABSTRACT

A presence detection device (10) for detecting the presence of an object (24) in a determined detection area, comprising at least one RFID tag (12A, 12B) that emits an identification signal at a determined RFID frequency; an RFID interrogator (16) receptive of the identification signal via at least one antenna (18); and an insulating plate (20) electromagnetically shielding the antenna from a direct emission of the identification signal,
wherein the presence of the object in a determined detection area results from the reception by the RFID interrogator after being reflected by the object of the identification signal emitted by the corresponding RFID tag.

15 Claims, 2 Drawing Sheets

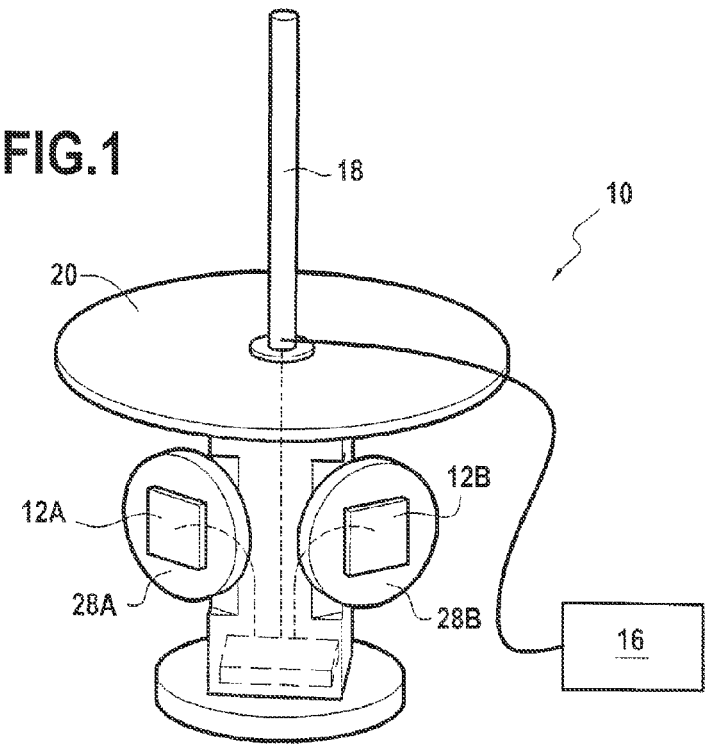
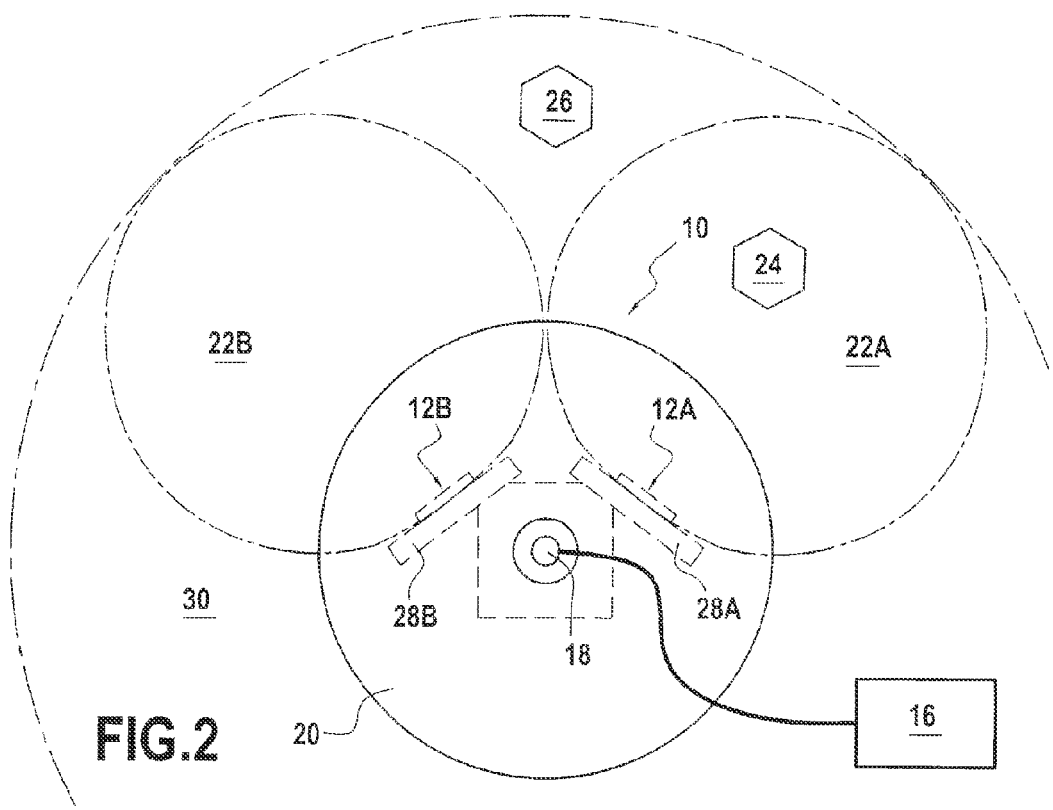

RFID PRESENCE DETECTION DEVICE

FIELD OF THE INVENTION

The invention generally relates to the field of presence detection sensors. More particularly, the invention concerns for instance the detection of forklift passage in docking zone.

PRIOR ART

Different techniques may be used to detect presence of an object in a determined area, for example a vehicle passing a crossing gate.

One technique includes the emission and detection of reflected infrared waves. Detectors used in this technique include at least one infrared source (with sufficient power to have a range of several meters) and an infrared sensor sensitive enough to detect a reflection from the object of infrared waves emitted by the source.

Another technique includes detecting reflection of high frequency microwaves emitted by an antenna. Such high frequency detectors include at least one source of high frequency microwaves (with a sufficient power to have a range of several meters) and a microwave receiver sensitive enough to detect a reflection from the object of high frequency microwaves emitted by the source.

While each technique may be suitable for its intended purpose, their typical power consumption of 60 mA at 12V may require a dedicated power source or frequent battery replacement. Accordingly, there is a need in the art for an enhanced presence detection arrangement.

OBJECT AND SUMMARY OF THE INVENTION

An aspect of the disclosure aims to overcome the disadvantages of the prior art by automatically detecting the presence of object while consuming only a small amount of energy.

Aspects of the disclosure achieve these goals with a presence detection device for detecting the presence of an object in a determined detection area, comprising:

at least one RFID tag that emits an identification signal at a determined RFID frequency;

an RFID interrogator receptive of the identification signal via at least one antenna; and an insulating plate electromagnetically shielding the antenna from a direct emission of the identification signal, wherein the presence of the object in a determined detection area results from the reception by the RFID interrogator after being reflected by the object of the identification signal emitted by the corresponding RFID tag.

According to an embodiment, the at least one RFID tag is a passive RFID tag and the identification signal is emitted in response to an electromagnetic wave received from the RFID interrogator via the at least one antenna and used for energized said passive RFID tag with the determined RFID frequency.

Advantageously, the determined RFID frequency is one of the two followings UHF frequencies: 866 MHz or 433 MHz.

The presence detection device may comprise one RFID tag and a plurality of directional antennas having each a distinct detection area, the presence of the object resulting from the reception by the RFID interrogator of the identification signal emitted by the RFID tag in a determined detection area corresponding to one of the plurality of directional antennas. It also may comprise a plurality of RFID tags and an omnidirectional antenna capable of receiving signals at 360°, the presence of the object in a determined detection area resulting from the reception by the RFID interrogator of the identification signal emitted by the corresponding one of the plurality of RFID tags.

Advantageously, the presence detection device further comprises reflecting supports upon which the RFID tags are placed. The reflecting supports may comprise a surface capable of covering at least a disk which has a diameter of a half wavelength of the frequency of the identification signals emitted by the RFID tags and are preferably made of metal or other electromagnetic reflector material.

Preferably, the RFID tag is an active RFID tag that transmits an identification signal with a period equal to or greater than 0.1 second and less than or equal to 1 second.

BRIEF DESCRIPTION OF THE DRAWINGS

Other characteristics and advantages of the present invention appear more clearly from the following description given by way of non-limiting indication and with reference to the accompanying drawings, in which:

FIG. 1 is a perspective view of one embodiment of a device according to the invention, FIG. 2 is a top view of the embodiment of FIG. 1.

DETAILED DESCRIPTION OF EMBODIMENTS

Figure 3:
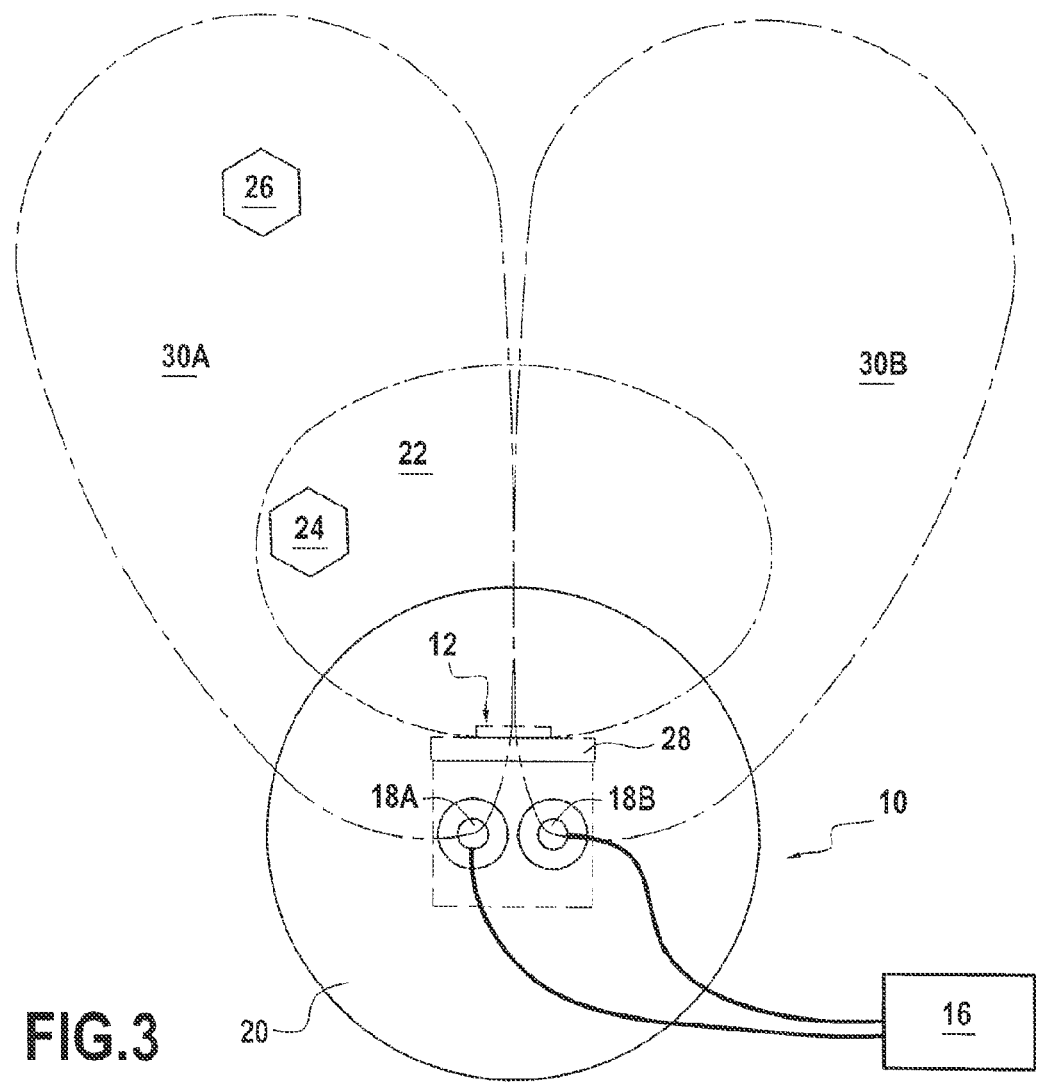
FIG. 3 is a top view of another embodiment of a device according to the invention.

A first embodiment of a presence detection device according to the invention is illustrated in FIG. 1 in a schematic perspective view.

The presence detection device 10 comprises at least one RFID tag 12A, 12B, an independent power supply 14, an RFID interrogator 16 comprising at least one emitting and receiving antenna 18 that is electromagnetically isolated from the RFID tag by an insulating plate 20 which shields the antenna 18 from the identification signals emitted directly from the RFID tag 12A, 12B.

According to the present invention, RFID tags are not used, as classically, to identify the object in which such RFID tag is embedded but only for their capability of emitting an electromagnetic signal with relatively low power consumption. Indeed, with this specific structure using RFID tags, the presence detection device of the invention can have a power consumption of approximately 10 mA at 12V.

The RFID tags 12A, 12B can be active RFID tags, self-powered, emitting an identification signal at regular intervals or passive RFID tags and, as known, powered by the RFID interrogator. So, in the absence of any electromagnetic waves, the passive RFID tags are not powered and do not emit any identification signal.

The operating of the device of FIG. 1 is now explained in regard to FIG. 2 which is a top view of this device showing corresponding detection areas 22A, 22B of each RFID tag 12A, 12B and two objects, the presence of which is sought in these two areas of interest, one 24 inside one of these two detection areas and a second 26 outside these areas. Each RFID tag 12A, 12B may be attached preferably to electromagnetic waves reflecting supports 28A, 28B to improve directionality of the identification signals of the respective RFID tags. Moreover, improved directionality can reduce an overlap between the detection areas 22A and 22B, such that each RFID tag 12A, 12B may be used for object detection within each respective distinct detection area. Reference number 30 illustrates the detection area of the antenna 18 (circular in this embodiment) which must cover the two detection areas of the RFID tags. Indeed, an object can be detected only if it is present in both the detection area of a RFID tag and the detection area of the antenna. Reflecting supports are advantageously made of metal or other electromagnetic reflector material and are sized with a surface that is at least able to cover a disk with a diameter equal to one half of the wavelength of the identification signals emitted by the RFID tags 12A, 12B.

First, we consider that RFID tags are passive RFID tags. When an object 24 is present in the detection area 30 of the antenna 18 and in one of the detection areas 22A, 22B, the electromagnetic waves (used for energized passive RFID tags with their appropriate RFID frequency) emitted by the RFID interrogator 16 via the antenna 18 are reflected by the object 24, bypass the insulating plate 20 which prevents any direct transmission of the electromagnetic waves from the antenna 18 to the RFID tags 12A, 12B, and finally reach the concerned RFID tag (12A for example). The waves reflected by the object 24 thus power the RFID tag and once powered, the RFID tag emits an identification signal at the RFID frequency which is also reflected by the object and then received by the antenna 18 of the RFID interrogator 16. By recognizing the identification signal, the RFID interrogator concludes that an object is present in the corresponding detection area.

In the absence of any object in the detection area 30 of the antenna, the electromagnetic waves emitted by the RFID interrogator 16 are broadcast without finding any object from which to be reflected. It is the same thing for the second object 26 present in the detection area 30 of the antenna 18 but which is outside the detection areas of the RFID tag because the electromagnetic waves returned to the RFID tag are not sufficient to power it. However, to be sure of this, it is necessary to define with precision the area of interest 22A, 22B in which the presence detection of an object occurs, the transmission power of the RFID interrogator 16 and antenna 18 may be calibrated. For example, if the transmission power of the RFID interrogator 16 and antenna 18 is too high, the electromagnetic waves emitted are reflected from distant objects 26 outside of the area of interest 22A, 22B with enough power to power the RFID tag and consequently to emit an identification signal, in contradistinction with the desired result. In this case, a presence will be always detected whether or not an object is present in the area of interest.

In summary, the transmission power of the RFID interrogator 16 and of its antenna 18 may be calibrated so that the electromagnetic waves reflected by objects 26 outside of the area of interest 22A, 22B are not sufficient to power the RFID tags 12A, 12B, while the reflected waves from objects 24 in the detection area 22A, 22B are powerful enough to power the RFID tags, which are then responsive to emit their respective identification signal. More particularly, this calibration also depends on the material of the detected object. In general, a metallic object permitting a better reflection as another object will require less power for example.

We now consider that the RFID tags are active RFID tags. Such active RFID tags are self-powered and have increased transmission power which naturally increases the read range. For example, if an object 24 is in the detection area 22A, the identification signal emitted by RFID tag 12A will be reflected by the object and captured by the RFID interrogator 16 via its antenna 18 (we suppose that the detection area of the antenna covers the detection area of the RFID tag). Likewise, the object located in the detection area 22A does not reflect the identification signal emitted by the other RFID tag 12B (which emits within the area 22B). Therefore, the identification signal of the RFID tag 12A, received by the RFID interrogator 16, detects a presence of an object in the detection area 22A.

The size of the detection areas 22A, 22B may be increased while reducing the power consumption of the RFID interrogator 16 (which no longer powers the RFID tags). Thus, the size of the detection area 22A, 22B is controlled by adjusting the reception sensitivity of the RFID interrogator 16. Indeed, the farther an object is from the presence detection device, the lower is the strength, or level of the reflected identification signals received from the RFID tag 12A, 12B at the antenna 18. As a sensitivity of the RFID interrogator 16 is increased, a minimum threshold of signal detection from the RFID tags is lowered, and thus, the size of the detection area 22A, 22B is increased. As a sensitivity of the RFID interrogator 16 is decreased, a minimum threshold of signal detection from the RFID tags is increased, and thus, the size of the detection area 22A, 22B is decreased. That is, if the sensitivity of the RFID interrogator 16 is too low, objects near the presence detection device will not be detected (ie. the detection area 22A, 22B will be too small), conversely if the sensitivity of the RFID interrogator 16 is too high, objects far from the presence detection device will be detected (ie. the detection 22A, 22B area will be too large). Advantageously, the detection range is contemplated to range from 0 to up to one hundred meters.

Preferably, the emission period, or interval, between emissions of identification signals from the RFID tags 12A, 12B may be adjusted according to application needs. If the interval between emissions of identification signals is too large objects (particularly high velocity mobile objects) may pass through the detection area 22A, 22B without being detected. Power consumption is directly related to emission period. That is, as the interval or period between emissions is reduced (or frequency of emissions during a given time period is increased), the power consumption increases. Therefore, if the interval between emissions of identification signals is too small, power consumption may increase and reduce a service life of the power supply 14.

RFID tags with an emission period of 0.75 seconds are contemplated to have an operating service life of 4 years. Preferably, depending on the size of the detection area 22A, 22B, each RFID tag 12A, 12B may emit the identification signal with a period ranging from 0.1 s to 1 s. As a size of the detection area is increased; a period of emission may be increased. For example, as the size of the detection area increases, an amount of time that an object is within the detection area is expected to increase.

The RFID frequency may use UHF frequency 866 MHz or 433 MHz. Advantageously, the 866 MHz frequency is used, because this frequency allows better directionality and thus makes it possible to better define the desired detection area. Further, the 866 MHz frequency is more regulated than 433 MHz, and is therefore contemplated to have less interference from outside signal sources.

FIG. 3 depicts a schematic top view of another embodiment of the invention in which the presence detection device 10 comprises one RFID tag 12 and an RFID interrogator 16 equipped with at least two directional antennas 18A, 18B. Directional antennas are capable to read identification signal in a determined direction (and not at 360° as shown by detection area 30 for the omnidirectional antenna 18 of FIG. 2). Each antenna 18A, 18B may detect objects within its respective, distinct detection areas 30A, 30B. Naturally, as in the embodiment of FIG. 2, these two detection areas must cover the detection area 22 of the single RFID tag 12. If an object 24 is in the detection area 30A, the identification signals emitted by the RFID tag 12 will be reflected by the object and captured by antenna 18A and thus detected by RFID interrogator 16. Therefore, RFID interrogator 16, receiving the identification signal of the RFID tag 12 via the directional antenna 18A, detects the presence of the object 24 in the detection area 30A.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A presence detection device (10) for detecting the presence of an object (24) in a determined detection area (22A, 22B; 30A, 30B), comprising:
   at least one RFID tag (12A, 12B; 12) that emits an identification signal at a determined RFID frequency;
   at least one antenna (18; 18A, 18B);
   an RFID interrogator (16) receptive of the identification signal via said at least one antenna (18; 18A, 18B); and
   an insulating plate (20) electromagnetically shielding said at least one antenna from a direct emission of the identification signal of said at least one RFID tag,
   wherein the presence of the object in a determined detection area results from the reception by the RFID interrogator of the identification signal emitted by one of said at least one RFID tag after being reflected by the object.

2. The presence detection device of claim 1, wherein the at least one RFID tag is a passive RFID tag and the identification signal is emitted in response to an electromagnetic wave received from the RFID interrogator via the at least one antenna and used for energized said passive RFID tag with the determined RFID frequency.

3. Presence detection device according to claim 1, wherein the determined RFID frequency is one of the two followings UHF frequencies: 866 MHz or 433 MHz.

4. Presence detection device according to claim 1, comprising one RFID tag (12) and a plurality of directional antennas (18A, 18B) having each a distinct detection area (30A, 30B), the presence of the object (24) resulting from the reception by the RFID interrogator of the identification signal emitted by the RFID tag in a determined detection area (30A) corresponding to one (18A) of the plurality of directional antennas.

5. Presence detection device according to claim 1, comprising a plurality of RFID tags (12A, 12B) and an omnidirectional antenna (18) capable of receiving signals at 360°, the presence of the object (24) in a determined detection area (22A) resulting from the reception by the RFID interrogator of the identification signal emitted by the corresponding one (12A) of the plurality of RFID tags.

6. The presence detection device according to claim 4, further comprising reflecting supports (28; 28A, 28B) upon which the RFID tags (4A, 4B, 44A) are placed.

7. Presence detection device according to claim 6, wherein the reflecting supports comprise a surface capable of covering at least a disk which has a diameter of a half wavelength of the frequency of the identification signals emitted by the RFID tags.

8. Presence detection device according to claim 6, wherein the reflecting supports are made of metal or other electromagnetic reflector material.

9. Presence detection device according to claim 1, wherein the RFID tag is an active RFID tag that transmits an identification signal with a period equal to or greater than 0.1 second and less than or equal to 1 second.

10. Presence detection device according to claim 2, wherein the determined RFID frequency is one of the two followings UHF frequencies: 866 MHz or 433 MHz.

11. Presence detection device according to claim 2, comprising one RFID tag (12) and a plurality of directional antennas (18A, 18B) having each a distinct detection area (30A, 30B), the presence of the object (24) resulting from the reception by the RFID interrogator of the identification signal emitted by the RFID tag in a determined detection area (30A) corresponding to one (18A) of the plurality of directional antennas.

12. Presence detection device according to claim 2, comprising a plurality of RFID tags (12A, 12B) and an omnidirectional antenna (18) capable of receiving signals at 360°, the presence of the object (24) in a determined detection area (22A) resulting from the reception by the RFID interrogator of the identification signal emitted by the corresponding one (12A) of the plurality of RFID tags.

13. The presence detection device according to claim 5, further comprising reflecting supports (28; 28A, 28B) upon which the RFID tags (4A, 4B, 44A) are placed.

14. Presence detection device according to claim 13, wherein the reflecting supports comprise a surface capable of covering at least a disk which has a diameter of a half wavelength of the frequency of the identification signals emitted by the RFID tags.

15. Presence detection device according to claim 13, wherein the reflecting supports are made of metal or other electromagnetic reflector material.

* * * * *